United States Patent
Kim et al.

(10) Patent No.: US 9,741,158 B2
(45) Date of Patent: Aug. 22, 2017

(54) GRAPHIC PROCESSING UNIT AND TILE-BASED RENDERING METHOD

(71) Applicant: SAMSUNG ELECTRONICS CO., LTD., Suwon-si, Gyeonggi-do (KR)

(72) Inventors: Hong-Yun Kim, Suwon-si (KR); Chang-Hyo Yu, Yongin-Si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 345 days.

(21) Appl. No.: 14/255,171

(22) Filed: Apr. 17, 2014

(65) Prior Publication Data

US 2014/0347357 A1    Nov. 27, 2014

(30) Foreign Application Priority Data

May 24, 2013   (KR) .................. 10-2013-0059215

(51) Int. Cl.
| | |
|---|---|
| *G06T 17/00* | (2006.01) |
| *G06T 15/40* | (2011.01) |
| *G06T 15/00* | (2011.01) |
| *G06T 11/40* | (2006.01) |

(52) U.S. Cl.
CPC .............. *G06T 15/40* (2013.01); *G06T 11/40* (2013.01); *G06T 15/005* (2013.01); *G06T 2210/12* (2013.01)

(58) Field of Classification Search
None
See application file for complete search history.

(56) References Cited

U.S. PATENT DOCUMENTS

| | | | |
|---|---|---|---|
| 6,052,125 A * | 4/2000 | Gardiner | G06T 15/40 345/421 |
| 6,362,818 B1 * | 3/2002 | Gardiner | G06T 15/40 345/421 |
| 6,525,726 B1 * | 2/2003 | Xie | G06T 15/40 345/421 |
| 7,027,047 B2 | 4/2006 | Kim et al. | |
| 7,068,272 B1 | 6/2006 | Voorhies et al. | |
| 7,505,036 B1 * | 3/2009 | Baldwin | G06T 15/503 345/419 |
| 7,804,499 B1 * | 9/2010 | Molnar | G06T 15/005 345/422 |
| 8,228,328 B1 | 7/2012 | French et al. | |
| 2003/0025695 A1 * | 2/2003 | Morphet | G06T 15/40 345/423 |
| 2005/0057571 A1 * | 3/2005 | Stevens | G06F 1/32 345/501 |

(Continued)

FOREIGN PATENT DOCUMENTS

JP    2012-038132    2/2012

*Primary Examiner* — Anh-Tuan V Nguyen
(74) *Attorney, Agent, or Firm* — F. Chau & Associates, LLC (57) ABSTRACT

A graphics processing unit (GPU) is provided. The GPU includes a tiling unit and a rasterizer. The tiling unit is configured to determines primitives touching a corresponding tile in tiles in an image frame, to determine at least one representative primitive of the primitives using a depth value of each of the primitives, and to generate visible primitives of the primitives for the corresponding tile using a depth value of the at least one representative primitive. The rasterizer is configured to rasterize the at least one representative and the visible primitives.

14 Claims, 8 Drawing Sheets

(56) References Cited

U.S. PATENT DOCUMENTS

| | | | |
|---|---|---|---|
| 2005/0122323 A1* | 6/2005 | Huang | G06T 15/40 345/421 |
| 2005/0195187 A1* | 9/2005 | Seiler | G06T 15/405 345/422 |
| 2005/0195198 A1 | 9/2005 | Anderson et al. | |
| 2006/0209065 A1* | 9/2006 | Lapidous | G06T 15/40 345/422 |
| 2007/0103479 A1* | 5/2007 | Kim | G06T 15/205 345/581 |
| 2007/0146366 A1* | 6/2007 | Seetharamaiah | G06T 11/203 345/443 |
| 2007/0268289 A1 | 11/2007 | Yu et al. | |
| 2007/0268291 A1 | 11/2007 | Naoi | |
| 2008/0068375 A1* | 3/2008 | Min | G06T 15/405 345/422 |
| 2009/0051687 A1* | 2/2009 | Kato | G06T 15/80 345/426 |
| 2009/0066694 A1* | 3/2009 | Redshaw | G06T 15/005 345/423 |
| 2009/0167758 A1* | 7/2009 | Barczak | G06T 17/20 345/420 |
| 2010/0007662 A1 | 1/2010 | Cox et al. | |
| 2011/0193862 A1 | 8/2011 | Min et al. | |
| 2011/0242113 A1 | 10/2011 | Keall et al. | |
| 2012/0069021 A1 | 3/2012 | Son et al. | |
| 2012/0092366 A1* | 4/2012 | Smithers | G06T 1/60 345/629 |
| 2012/0212488 A1 | 8/2012 | Yu et al. | |
| 2012/0299910 A1* | 11/2012 | Liang | G06T 15/405 345/419 |
| 2013/0120380 A1* | 5/2013 | Kallio | G06T 15/005 345/421 |
| 2013/0127855 A1* | 5/2013 | Miller | G06T 15/405 345/422 |
| 2013/0155103 A1* | 6/2013 | Kakarlapudi | G09G 5/377 345/629 |
| 2013/0187947 A1* | 7/2013 | Barringer | G06T 11/40 345/629 |
| 2013/0342547 A1* | 12/2013 | Lum | G06T 15/005 345/505 |
| 2014/0071150 A1* | 3/2014 | Fishwick | G06T 15/005 345/589 |
| 2014/0071160 A1* | 3/2014 | Sugiura | G06F 17/30244 345/619 |
| 2014/0267258 A1* | 9/2014 | Yang | G06T 15/405 345/422 |
| 2015/0145873 A1* | 5/2015 | Akenine-Moller | G06T 11/40 345/506 |

* cited by examiner

GRAPHIC PROCESSING UNIT AND TILE-BASED RENDERING METHOD

CROSS-REFERENCE TO RELATED PATENT APPLICATION

This application claims priority under 35 U.S.C. §119 to Korean Patent Application. No. 10-2013-0059215, filed on May 24, 2013, in the Korean Intellectual Property Office, the disclosure of which is incorporated by reference herein.

TECHNICAL FIELD

The present invention relates to a graphics processing unit, and particularly a tile-based rendering method in the graphics processing unit.

DISCUSSION OF THE RELATED ART

A graphics processing unit (GPU) is a core unit that performs graphics processing operations in a computing system. A graphics pipeline, a hardware structure of the GPU, may have a three-dimensional (3D) object as an input and a two-dimensional (2D) rendering image as an output. As graphic resolution increases, demand for higher performing GPU, bandwidth, and memory also increases.

SUMMARY

According to an exemplary embodiment of the present invention, a graphics processing unit is provided. The graphics processing unit includes a tiling unit and a rasterizer. The tiling unit is configured to identity a plurality of primitives touching a corresponding tile of a plurality of tiles in an image frame, to determine at least one representative primitive of the plurality of primitives using a depth value of each of the plurality of primitives, and to determine visible primitives of the plurality of primitives for the corresponding tile using a depth value of the at least one representative primitive. The at least one representative primitive is rasterized prior to the visible primitives, and the visible primitives are rasterized according to a rendering order.

In an embodiment, the tiling unit may include a first early depth tester configured to determine the visible primitives by comparing a depth value of each of the plurality of primitives with the depth value of the at least one representative primitive.

In an embodiment, the first early depth tester may use a first coverage mask and a second coverage mask to determine the visible primitives, and the first coverage mask may indicate a portion of the corresponding tile touched by the plurality of primitives and the second coverage mask may indicate a portion of the corresponding tile touched by the at least one representative primitive.

In an embodiment, the rasterizer may be configured to receive a primitive list for each of the plurality of tiles from a memory, and the primitive list may include an identifier of the at least representative primitive and identifiers of the visible primitives.

In an embodiment, the rasterizer may include a sequencer configured to extract the identifier of the at least one representative primitive from the primitive list, and to control the rendering order by referring to the identifier of the at least one representative primitive.

In an embodiment, the rasterizer may include an interpolation unit and a second early depth tester. The interpolation unit may be configured to generate a plurality of fragments forming an inside of each of the plurality of primitives. The second early depth tester may be configured to determine visibility of each of the plurality of fragments.

In an embodiment, the second early depth tester may determine the visibility of each of the plurality of fragments by comparing a depth value of the corresponding tile with a depth value of each of the plurality of fragments.

In an embodiment, the second early depth tester may determine the visibility of each of the plurality of fragments by comparing a depth value of each of the plurality of fragments previously rendered at the same position with a depth value of each of the plurality of fragments to be presently rendered belonging to the inside of the corresponding tile.

In an embodiment, the tiling unit may output a primitive list including identifiers of the at least one representative primitive and the visible primitives to a memory.

In an embodiment, the at least one representative primitive may be rasterized later than the visible primitives, and the visible primitives are rasterized according to a rendering order.

According to an exemplary embodiment of the present invention, a graphics processing unit is provided. The graphics processing unit includes a tiling unit and a rasterizer. The tiling unit is configured to identify a plurality of primitives touching a corresponding tile of a plurality of tiles in an image frame, to determine at least one representative primitive of the plurality of primitives using a depth value of each of the plurality of primitives, to perform a first early depth test on the plurality of primitives to determine visible primitives of the plurality of primitives for the corresponding tile using a depth value of the at least one representative primitive. The rasterizer is configured to perform rasterization on the at least representative primitive and the visible primitives by generating a plurality of fragments forming an inside of each of the at least one representative primitive and the visible primitives, performing a second early depth test on the plurality of fragments, and determining visibility of each of the plurality of fragments. The at least one representative and the visible primitives are rasterized in a different order from a rendering order at the tiling unit.

In an embodiment, the tiling unit may be configured to compare a depth value of each of the plurality of primitives with the depth value of the at least one representative primitive to determine the visible primitives.

In an embodiment, the tiling unit may use a first coverage mask and a second coverage mask to determine the visible primitives, and the first coverage mask may indicate a portion of the corresponding tile touched by the plurality of primitives and the second coverage mask may indicate a portion of the corresponding tile touched by the at least one representative primitive.

In an embodiment, the rasterizer may include a sequencer configured to extract an identifier of the at least one representative primitive, and to control the rendering order by referring to the identifier of the at least one representative primitive.

According to an exemplary embodiment of the present invention, a tile-based rendering method is provided. The method includes generating a plurality of primitives each including one or more vertexes, calculating a 3D bounding box forming a boundary for each of the plurality of primitives, performing tile binning on the plurality of primitives according to a rendering order using the 3D bounding box, calculating a depth value of each of the plurality of primitives using the 3D bounding box, determining at least one representative primitive among the plurality of primitives touching a corresponding tile of a plurality of tiles in an image frame using a depth value of each of the plurality of primitives, and rasterizing the plurality of primitives touching the corresponding tile. The at least one representative primitive among the plurality of primitives touching the corresponding tile is rasterized in a different order from the rendering order.

In an embodiment, the performing of the tile binning may include comparing a depth value of each of the plurality of primitives with the depth value of the at least one representative primitive to determine visibility of the plurality of primitives touching the corresponding tile, and discarding data of invisible primitives.

In an embodiment, the determining of the visibility of the plurality of primitives may include using a first coverage mask and a second coverage mask. The first coverage mask may indicate a portion of the corresponding tile touched by the plurality of primitives and the second coverage mask may indicate a portion of the corresponding tile touched by the at least one representative primitive.

In an embodiment, the rasterizing of the plurality of primitives may include receiving a primitive list for the corresponding tile from the memory, extracting an identifier of the at least one representative primitive from the primitive list, and controlling the rendering order by referring to the identifier of the at least one representative primitive. The at least one representative primitive may be rasterized prior to the other primitives among the plurality of primitives touching the corresponding tile, and the other primitives may be rasterized according to the rendering order.

In an embodiment, the rasterizing of the plurality of primitives may include receiving a primitive list for the corresponding tile from the memory, extracting an identifier of the at least one representative primitive from the primitive list, and controlling the rendering order by referring to the identifier of the at least one representative primitive. The at least one representative primitive may be rasterized later than the other primitives among the plurality of primitives touching the corresponding tile, and the other primitives may be rasterized according to the rendering order.

BRIEF DESCRIPTION OF THE DRAWINGS

The above and other features of the present invention will become more apparent by describing in detail embodiments thereof with reference to the attached drawings in which.

DETAILED DESCRIPTION OF THE EMBODIMENTS

The present invention will now be described more fully hereinafter with reference to the accompanying drawings. This invention may, however, be embodied in different forms and should not be construed as limited to the embodiments set forth herein. Rather, these embodiments are provided so that this disclosure will be thorough and complete, and will filly convey the scope of the invention to those skilled in the art. The same reference numbers may indicate the same components throughout the specification. In the attached figures, the thickness of layers and regions may be exaggerated for clarity.

Hereinafter, a computing system including a GPU according to an embodiment of the present invention will be described with reference to FIG. 1.

Figure 1:
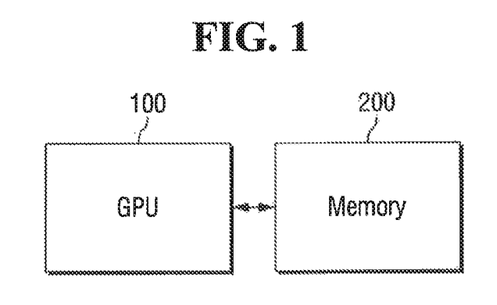
FIG. 1 is a block diagram of a computing system including a GPU according to an embodiment of the present invention.

FIG. 1 is a block diagram of a computing system including a GPU according to an embodiment of the present invention.

Referring to FIG. 1, the computing system 1 according to an embodiment of the present invention includes a GPU 100 and a memory 200.

The GPU 100 is configured to perform tile-based rendering. To this end, the GPU 100 includes graphics pipeline components. The graphics pipeline may also be referred to as a rendering pipeline. The graphics pipeline configuration may be capable of processing graphic data in a pipelined manner. The graphics pipeline may be configured in a software or a hardware.

The memory 200 is configured to store data. The memory 200 may store graphic data processed by the GPU 100 or provided to the GPU 100. In addition, the memory 200 may function as a working memory of the GPU 100. The memory 200 may include at least one volatile memory such as a double data rate static DRAM (DDR SDRAM), a single data rate static DRAM (SDR SDRAM), or the like, and/or at least one nonvolatile memory such as an electrical erasable programmable ROM (EEPROM), a flash memory, or the like.

Figure 2:
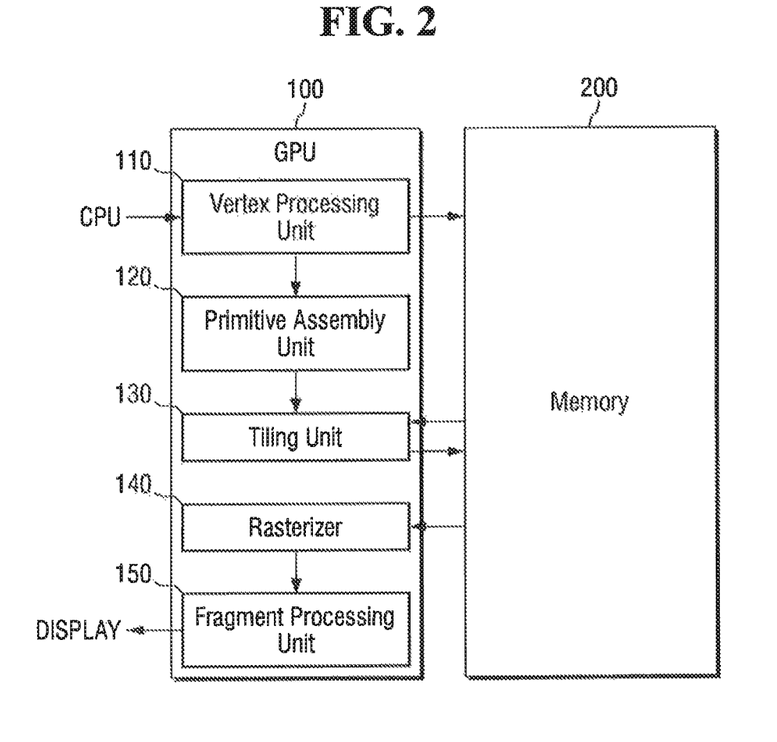
FIG. 2 is a block diagram illustrating a specific configuration of a graphics pipeline of the GPU shown in FIG. 1.

FIG. 2 is a block diagram illustrating a specific configuration of a graphics pipeline of the GPU shown in FIG. 1.

Referring to FIG. 2, the GPU 100 includes a vertex processing unit 110, a primitive assembly unit 120, a tiling unit 130, a rasterizer 140, and a fragment processing unit 150.

The vertex processing unit 110 may be configured to receive a vertex, to convert the received vertex, and to output the converted vertex to the primitive assembly unit 120. The vertex may be received from a central processing unit (CPU). The vertex processing unit 110 may be configured to receive a single vertex and to output the single vertex. For example, the vertex may include properties such as a position, a normal vector, a color value, and so on, but aspects of the present invention are not limited thereto. The position property of the vertex may be provided as a coordinate in a 3D space. For example, the position property of the vertex may include x, y, and z coordinates. The x coordinate may be a horizontal coordinate, the y coordinate may be a vertical coordinate, and the z coordinate may be a depth coordinate. The vertex processing unit 110 may convert an object space vertex into a clip space vertex. In detail, the vertex processing unit 110 may convert the object space vertex into a world space vertex, may convert the world space vertex into a camera space vertex, and may convert the camera space vertex into the clip space vertex.

The primitive assembly unit 120 may be configured to receive the clip space vertex from the vertex processing unit 110, to generate a primitive, and to output the same to the tiling unit 130. The primitive assembly unit 120 may generate a primitive composed of one or more vertexes. For example, the primitive assembly unit 120 may generate a triangular primitive having three vertexes.

Hereinafter, embodiments of the present invention will be described with regard to the triangular primitive. But aspects of the present invention are not limited thereto. For example, the present invention may also be applied to other types of primitives such as, points, lines, quadrangles, or the like. The primitive may include a property of connection information between vertexes. The connection information between the vertexes may represent an order in which the vertexes included in the primitive are connected to each other (e.g., in a clockwise direction or a counterclockwise direction). A front face and a back face of the primitive may be distinguished from each other according to the value of connection information.

Figure 3:
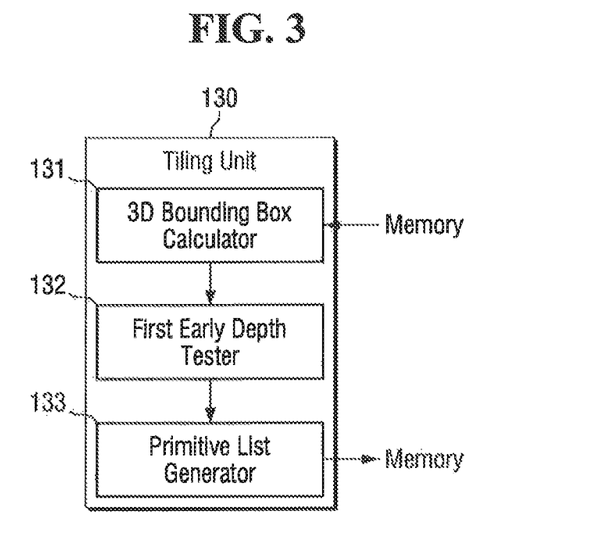
FIG. 3 is a block diagram illustrating a specific configuration of a tiling unit shown in FIG. 2.

The tiling unit 130 may be configured to receive primitives from the primitive assembly unit 120, to generate primitive lists, and to output the same to the memory 200. Referring to FIG. 3, the tiling unit 130 may include a 3D bounding box calculator 131, a first early depth tester 132, and a primitive list generator 133.

The tiling unit 130 may divide an image frame to be rendered into a plurality of tiles and may generate the primitive list for each of the plurality of tiles. Each of the plurality of tiles may include a plurality of pixels in the image frame. In addition, the tiling unit 130 may further divide each tile into a plurality of sub-tiles.

The tiling unit 130 may perform tile binning on the received primitives and may approximately determine tiles that are touched by the primitive. The touching of the tiles by the primitive may mean that at least a portion of the primitive belongs to an inside of the corresponding tiles. In addition, the tiling unit 130 may allocate a primitive that touches a tile to a primitive list of the tile. The allocation of the primitive to the primitive of the tile may be repeated for each of the plurality of tiles and the tiling unit 130 may output a plurality of primitive lists corresponding to each of the plurality of tiles. The tiling unit 130 may be configured to receive a single primitive and to perform tile binning on the single primitive (e.g., one primitive at a time). For example, a tile may include a coverage mask as a property, but aspects of the present invention are not limited thereto. For the respective pixels constituting the tile, the coverage mask may indicate whether there is a primitive touching the pixels. The graphics pipeline may perform rendering with respect to each tile and thus, may complete the rendering on the overall image frame.

To this end, the 3D bounding box calculator 131 may calculate a 3D bounding box forming boundaries of a primitive. In an embodiment of the graphics pipeline, a 2D bounding box calculator may be used to calculate a 2D bounding box that forms boundaries of the primitive. The 2D bounding box calculator may calculate the 2D bounding box using x and y coordinates of the primitive. In a case of a triangular primitive, for example, the 2D bounding box calculator may calculate the 2D bounding box using the maximum and minimum values in x and y coordinates of 3 vertexes constituting the triangular primitive.

Unlike the 2D bounding box calculator, the 3D bounding box calculator 131 according to an embodiment of the present invention may calculate the 3D bounding box using x, y and z coordinates of the primitive. In a case of a triangular primitive, for example, the 3D bounding box calculator 131 may calculate the 3D bounding box using the maximum and minimum values in x, y and z coordinates of 3 vertexes constituting the triangular primitive. The calculated 3D bounding box may be configured to perfectly surround the boundaries of the triangular primitive. For example, in a first primitive Pa shown in FIG. 4, it is assumed that maximum and minimum values in x coordinate of 3 vertexes V0, V1 and V2 are x0 and x2, respectively, the maximum and minimum values in y coordinate are y2 and y0, respectively, and the maximum and minimum values in z coordinate are z1 and z0, respectively. In this case, the 3D bounding box calculator 131 may calculate points of Pmax (x0, y2, z1) and Pmin (x2, y0, z0) including the maximum and minimum values of the respective coordinates. The first bounding box Ba may be defined by the points of the Pmax and the Pmin.

Figure 4:
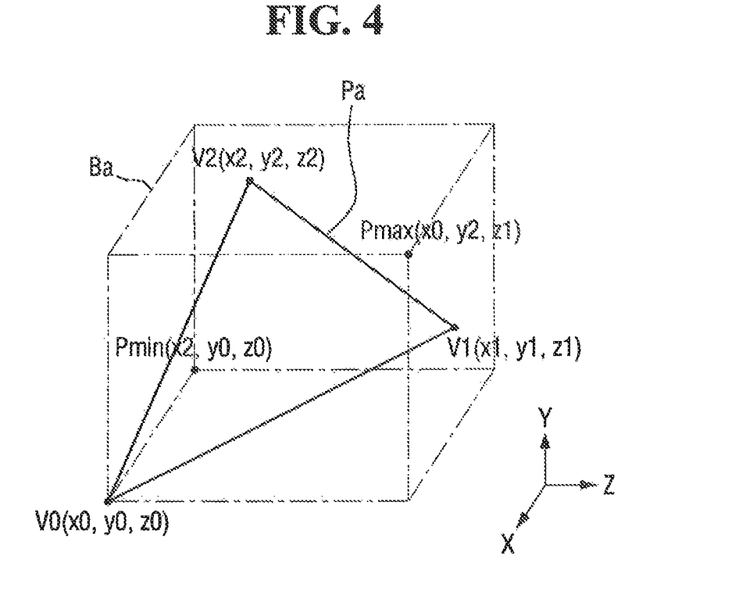
FIG. 4 illustrates an operation of calculating a 3D bounding box of the tiling unit shown in FIG. 2.

The tiling unit 130 may calculate the maximum and minimum values in z coordinate of the first bounding box Ba as the maximum and minimum depth values of the first primitive Pa. The maximum and minimum values in x and y coordinates of the first bounding box Ba may be used to perform the tile binning on the first primitive Pa.

Figure 5:
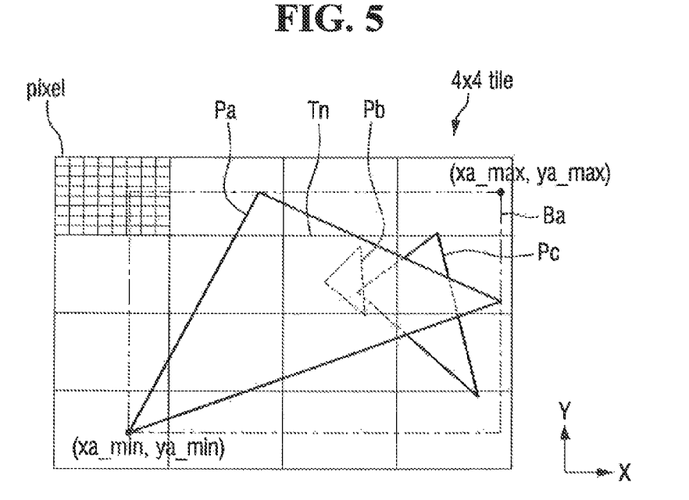
FIG. 5 illustrates a tile binning operation of the tiling unit shown in FIG. 2.

For example, in 4×4 tiles shown in FIG. 5, the tiling unit 130 may perform the tile binning on the first primitive Pa using the values in x and y coordinates of the first bounding box Ba. FIG. 5 illustrates the first primitive Pa and a 3D bounding box projected on a 2D screen. Although the 2D screen is partitioned into 4×4 tiles in the embodiment of the present invention, but aspects of the present invention are not limited thereto. Using the maximum values (xa_max, ya_max) and the minimum values (xa_min, ya_min) in x and y coordinates of the first bounding box Ba, the tiling unit 130 may determine that the first primitive Pa touches a plurality of tiles including an n-th tile (Tn), and may allocate the first primitive Pa to a primitive list of the n-th tile Tn. The xa_max and the xa_min may correspond to x0 and x2 of FIG. 4, and the ya_max and the ya_min may correspond to y2 and y0 of FIG. 4. Next, in the same manner as described above, the tiling unit 130 may determine that a second primitive Pb and a third primitive Pc touch the n-th tile Tn. In addition, the tiling unit 130 may allocate the second primitive Pb and the third primitive Pc to the primitive list of the n-th tile Tn.

The first early depth tester 132 may perform a first early depth test in a primitive level for each of the plurality of tiles divided from an image frame. The first early depth test is performed to approximately determine visibility of each of the plurality of primitives touching a tile. For example, the first early depth tester 132 may discard data of a primitive when the primitive is completely masked by another primitive in the tile and may determine the primitive to be invisible in the tile of an image frame. Further, the first early depth tester 132 may output visible primitives which are not invisible primitives in the tile. The first early depth tester 132 is configured to receive a single primitive and to perform the first early depth test on the single primitive (e.g., one primitive at a time). The first early depth tester 132 may determine the visible primitives with respect to each of the plurality of tiles and thus may complete the same on the overall image frame.

For example, a tile may further include a depth value as a property, but aspects of the present invention are not limited thereto. The maximum and minimum depth values of a representative primitive may be allocated as the maximum and minimum depth values of the tile, respectively. The representative primitive may be determined from a plurality of primitives touching the tile. For example, the closest primitive, the farthest primitive or the like for each of the plurality of tiles may be determined as the representative primitive. Alternatively, a transparent primitive may be determined as the representative primitive.

The closest primitive indicates a primitive positioned to be closest to a camera among the primitives that touch the tile, and the farthest primitive indicates a primitive positioned to be farthest from the camera among the primitives that touch the tile. A depth value of a primitive may mean a distance from the camera in the z coordinate. For example, a primitive having the largest depth value (a primitive having the smallest depth value when the z coordinate is inverted) may be farthest from the camera. The first early depth tester 132 may determine the closest primitive and the farthest primitive using the minimum depth value or the maximum depth value of each of the plurality of primitives. Alternatively, the first early depth tester 132 may determine the closest primitive and the farthest primitive using the minimum depth value and the maximum depth value of each of the plurality of primitives.

The first early depth tester 132 may approximately determine visibility of a primitive using the maximum and minimum depth values of the primitive. The first early depth tester 132 may compare a depth value of a tile and a depth value of the primitive to determine the visibility of the primitive. For example, when the closest primitive is determined as the representative primitive and the minimum depth value of the primitive is greater than the maximum depth value of the tile, the first early depth tester 132 may determine the primitive as an invisible primitive that is masked by the closest primitive. When the minimum depth value of a primitive to be presently rendered is smaller than the minimum depth value of the tile, the first early depth tester 132 may update the primitive to be presently rendered as a new representative primitive and the depth value of the primitive to be presently rendered as a depth value of the tile.

The first early depth tester 132 may perform a first early depth test using two coverage masks. One of the coverage masks may indicate a portion of the tile touched by the representative primitive and the other coverage mask may indicate a portion of the tile touched by a primitive to be presently rendered. When it is determined based on the coverage masks that there is no primitive touching a tile, the first early depth tester 132 might not perform the first early depth test on the tile.

Figure 6:
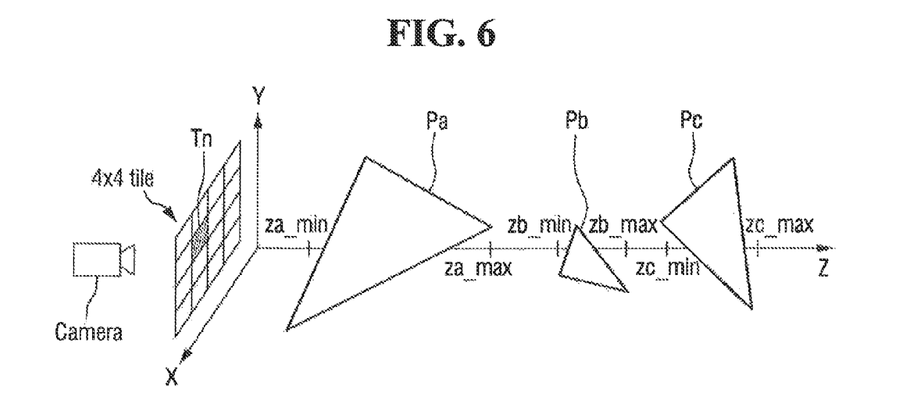
FIG. 6 illustrates a first early depth test operation of the tiling unit shown in FIG. 2.

For example, referring to FIG. 6, when a first early depth test is performed on the n-th tile Tn, it is assumed that a third primitive Pc, a second primitive Pb, and a first primitive Pa are input to the tiling unit 130 in a rendering order of primitives. In this case, the first early depth tester 132 may first allocate an identifier of a representative primitive as an identifier of the third primitive Pc. Next, since the minimum depth value zb_min of the second primitive Pb is smaller than the minimum depth value of the n-th tile Tn (i.e., the minimum depth value zc_min of the third primitive Pc), the first early depth tester 132 may update the second primitive Pb as a new representative primitive. In addition, since the minimum depth value zc_min of the third primitive Pc is greater than the maximum depth value of the n-th tile Tn (i.e., the maximum depth value zb_max of the second primitive Pb), the first early depth tester 132 may determine that the third primitive Pc is masked by the second primitive Pb in the n-th tile Tn. Next, since the minimum depth value za_min of the first primitive Pa is smaller than the minimum depth value of the n-th tile Tn (i.e., the minimum depth value zb_min of the second primitive Pb), the first early depth tester 132 may update again the first primitive Pa as a new representative primitive. In addition, since the minimum depth value zb_min of the second primitive Pb is greater than the maximum depth value of the n-th tile Tn (i.e., the maximum depth value za_max of the first primitive Pa), the first early depth tester 132 may determine that the second primitive Pb is masked by the first primitive Pa in the n-th tile Tn.

The primitive list generator 133 may generate primitive lists for each of the plurality of tiles and may output the primitive lists to the memory 200. The primitive list may include identifiers of a plurality of primitives touching a tile and an identifier of a representative primitive as a property, but aspects of the present invention are not limited thereto. According to the result of the first early depth test, invisible primitives masked by other primitives might not be included in the primitive list. For example, the primitive list for the n-th tile Tn shown in FIGS. 5 and 6 may include only the identifiers of the first primitive Pa and the third primitive Pc.

In a case where the tiling unit 130 manages an image frame in units of sub-tiles, the tiling unit 130 may determine sub tiles that are touched by a primitive or may determine a representative primitive for each of the sub-tiles.

Figure 7:
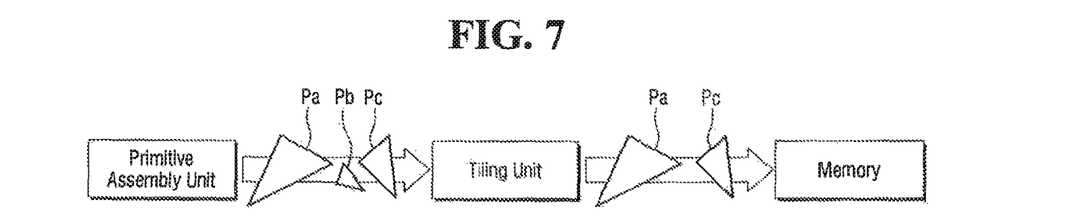
FIG. 7 schematically illustrates that a second primitive is removed by the tiling unit shown in FIG. 2.

FIG. 7 illustrates that the second primitive Pb is removed by the tiling unit 130 shown in FIG. 2.

Referring to FIG. 7, the primitive assembly unit 120 may generate the first to third primitives Pa, Pb and Pc and to output the same, and the tiling unit 130 may receive the first to third primitives Pa, Pb and Pc. The tiling unit 130 may perform the the binning on the first to third primitives Pa, Pb and Pc and the first early depth test according to the rendering order of primitives. Further, the tiling unit 130 may generate primitive lists for each of the tiles according to the result of the performed first early depth test and may output the generated primitive lists to the memory 200. As shown in FIG. 5, since the second primitive Pb is masked by the first primitive Pa, the second primitive Pb may be determined to be invisible. Thus, the primitive lists for each of the tiles, output from the tiling unit 130, are related to the first primitive Pa and the third primitive Pc.

The rasterizer 140 may be configured to receive the primitive lists from the memory 200, to rasterize primitives referred by each of the primitive lists, and to output the same to the fragment processing unit 150.

Figure 8:
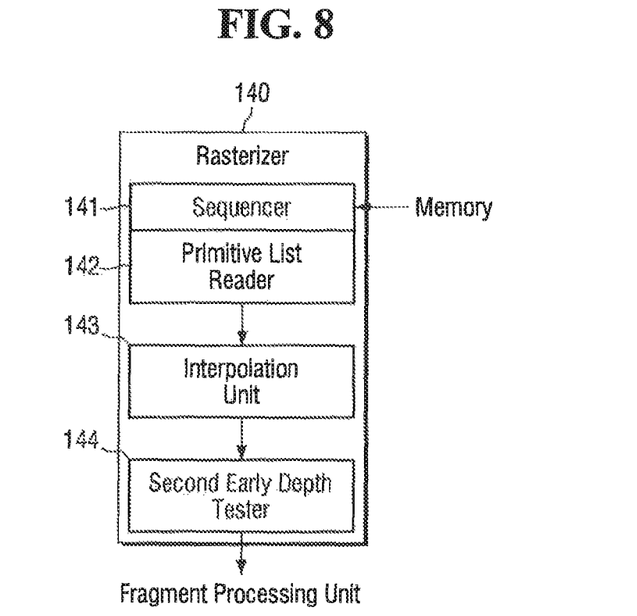
FIG. 8 is a block diagram illustrating a specific configuration of a rasterizer shown in FIG. 2.

Referring to FIG. 8, the rasterizer 140 may include a sequencer 141, a primitive list reader 142, an interpolation unit 143, and a second early depth tester 144.

The primitive list reader 142 may read primitive lists for each of the tiles from the memory 200. The primitive list reader 142 may first receive a representative primitive from the memory 200 and may then receive the other primitives according to the rendering order. Alternatively, the primitive list reader 142 may lastly receive the representative primitive from the memory 200 and may receive the other primitives according to the rendering order.

To this end, the sequencer 141 may control the rendering order of primitives at a stage of rasterizing the primitives. The sequencer 141 may extract an identifier of the representative primitive from each of the primitive lists. Then, the sequencer 141 may change the rendering order of primitives by referring to the identifier of the representative primitive. The sequencer 141 may control the primitive list reader 142 to first receive a primitive corresponding to the identifier of the representative primitive from the memory 200 and may receive the other primitives according to the rendering order of primitives processed at the previous stage.

Accordingly, the representative primitive may have priority at a rasterizing stage to be rasterized prior to the other primitives. The other primitives may be rasterized according to the rendering order of primitives processed at the previous stage.

Alternatively, the sequencer 141 may control the primitive list reader 142 to lastly receive the primitive corresponding to the identifier of the representative primitive from the memory 200 and to receive the other primitives according to the rendering order of primitives processed at the previous stage.

Accordingly, the other primitives may be rasterized according to the rendering order of primitives processed at the previous stage and the representative primitive may be lastly rasterized.

Figure 9:
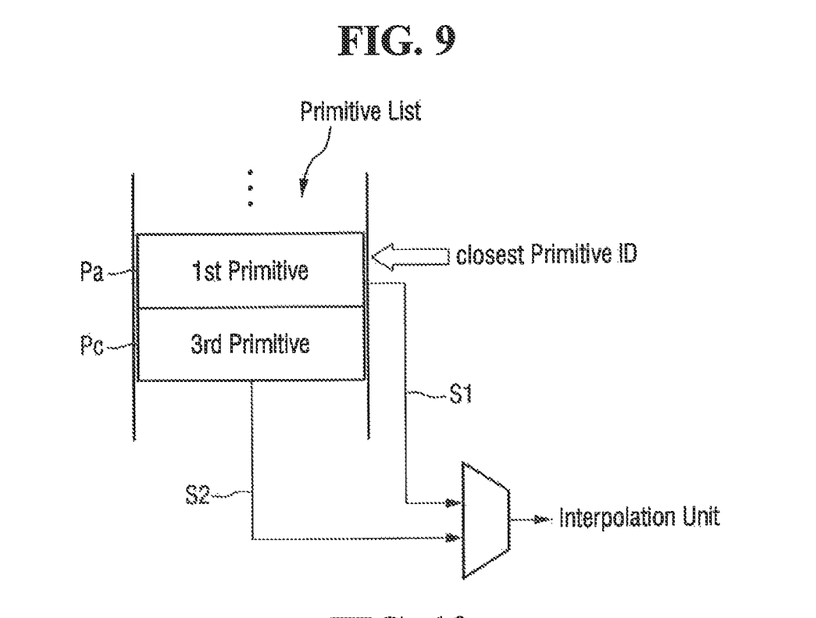
FIG. 9 illustrates a primitive rendering order changing operation of the rasterizer shown in FIG. 2.

FIG. 9 illustrates an operation of changing a rendering order of primitives in the rasterizer shown in FIG. 2.

Referring to FIG. 9, in a primitive list of the n-th tile Tn stored in the memory 200, a first primitive Pa and a third primitive Pc may be arranged according to the rendering order. The primitive list may have a data structure of a queue type. In an embodiment of the graphics pipeline, the primitives may be transferred to the rasterizing stage in a first in first out (FIFO) manner based on the rendering order.

Alternatively, the sequencer 141 may change the rendering order of primitives by referring to the identifier of the representative primitive. For example, when the closest primitive is determined as a representative primitive, the primitive list reader 142 may first receive the first primitive Pa corresponding to an identifier of the closest primitive and then, may transfer the first primitive Pa to the interpolation unit 143 (S1). Next, the primitive list reader 142 may receive the third primitive Pc according to the original rendering order and then, may transfer the third primitive Pc to the interpolation unit 143 (S2). In a case where additional primitives are further arranged in the primitive list, the primitive list reader 142 may transfer the other primitives to the interpolation unit 143 in the FIFO manner according to the original rendering order in substantially the same manner as described above.

The interpolation unit 143 may generate a set of fragments using the primitives. The fragments may indicate 3D dots that constitute the inside of the primitives. Each of the fragments may correspond to one of the pixels of an image frame. For example, x and y coordinates of the fragments may be aligned on a pixel-grid of a 2D screen.

The interpolation unit 143 may interpolate values of the vertexes that constitute the primitives and may determine positions, normal vectors, and color values of the fragments, or the like. For example, position properties of the fragments may include x, y and z coordinates, which is substantially the same as the position properties of the vertexes. Specifically, each value in z coordinate of the fragments may indicate a depth value. The interpolation unit 143 may be configured to receive a single primitive and to interpolate the fragments, and to generate the same (e.g., one primitive at a time).

The second early depth tester 144 may perform a second early depth test in a fragment level for each of the tiles. The second early depth test is performed to determine visibility of a fragment that belongs to the inside of a tile, to determine visible fragments to be rendered on an image frame on which rendering has been completely performed, and to discard data of invisible fragments. The second early depth tester 144 is configured to receive fragments of a single primitive and to perform the second early depth test on the fragments of the single primitive (e.g., one primitive at a time).

Based on the result of the second early depth test, the second early depth tester 144 may determine depth values of all fragments that belong to the inside of the tile. The second early depth tester 144 may determine maximum and minimum depth values of the fragments.

The second early depth tester 144 may determine visibility of the fragments using the depth values of the fragments. For example, the second early depth tester 144 may compare a depth value of a tile and the depth values of the fragments to determine the visibility of the fragments. The maximum and minimum depth values of the fragments may be allocated as the maximum and minimum depth values of the tile at a rasterizing stage, unlike the maximum and minimum depth values of the tile at a tiling stage. For example, when a depth value of a fragment to be presently rendered is greater than the maximum depth of the tile, the second early depth test may determine that the fragment is an invisible fragment. Alternatively, the second early depth tester 144 may determine visibility of a fragment to be presently rendered by comparing a depth value of a fragment previously rendered at the same position with the depth value of the fragment to be presently rendered. When the depth value of the fragment to be presently rendered is greater than the depth value of the fragment previously rendered at the same position, the second early depth tester 144 may determine that the fragment is an invisible fragment.

For example, it is assumed that the rendering order is changed as described above with reference to FIG. 9 and the first primitive Pa and the third primitive Pc are input to the second early depth tester 144 in that rendering order in the second early depth test. In this case, the second early depth tester 144 may determine visibility of fragments that constitute the first primitive Pa for the n-th tile Tn, and may allocate the maximum and minimum depth values of the fragments as the maximum and minimum depth values of the n-th tile Tn. The fragments may belong to the inside of the n-th tile Tn and may constitute the first primitive Pa. Next, the second early depth tester 144 may determine visibility of fragments constituting the third primitive Pc for the n-th tile Tn. Since depth values of the fragments constituting the third primitive Pc are greater than the maximum depth value of the n-th tile Tn, the second early depth tester 144 may determine that all of the fragments constituting the third primitive Pc for the n-th tile Tn are invisible fragments.

The rasterizer 140 may convert a clip space vertex into a screen space vertex.

Figure 10:
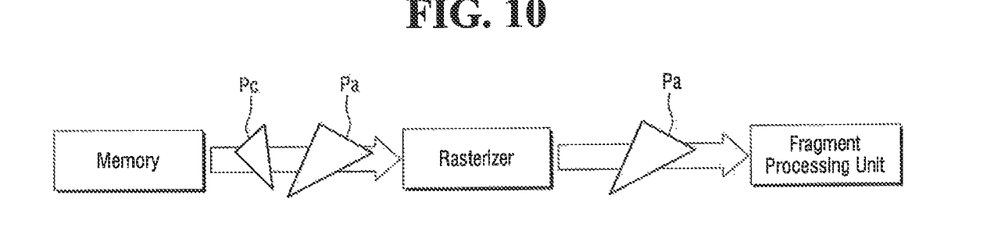
FIG. 10 schematically illustrates that a primitive rendering order is changed and a third primitive is removed by the rasterizer shown in FIG. 2.

FIG. 10 illustrates that a rendering order of primitives is changed and the third itive Pc is removed by the rasterizer shown in FIG. 2.

Referring to FIG. 10, the rasterizer 140 receives primitive lists for each of the tiles from the memory 200. The primitive list may be related to the first primitive Pa and the third primitive Pc. Since the rendering order of primitives is changed, the rasterizer 100 first receives the first primitive Pa and then receives the third primitive Pc for each of the tiles from the memory 200, unlike at the previous stage. The rasterizer 140 performs the second early depth test on the fragments constituting the first primitive Pa and the third primitive Pc, and outputs only visible fragments to the fragment processing unit 150. The visible fragment may be determined based on the performed second early depth test. For example, as shown in FIG. 10, for the n-th tile Tn, all of the fragments constituting the third primitive Pc are masked by the fragments constituting the first primitive Pa to then be invisible, and thus, the fragments output from the rasterizer 140 are related to only the first primitive Pa.

The fragment processing unit 150 may receive fragments and may process the received fragments with hidden surface elimination, lighting, surface shading, texture mapping, and so on. The fragment processing unit 150 may output the image frame on which rendering has been completely performed to a display.

Hereinafter, a tile-based rendering method will be described using the specific configuration of the graphics pipeline of the GPU 100. Detailed descriptions of repeated contents described with reference to FIGS. 1 to 10 will be omitted.

Figure 11:
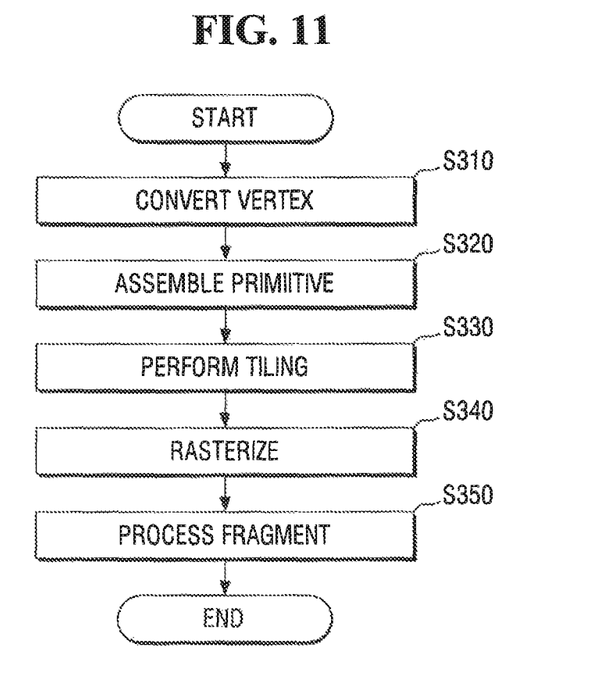
FIG. 11 is a flowchart illustrating a tile-based rendering method according to an embodiment of the present invention.

FIG. 11 is a flowchart illustrating a tile-based rendering method according to an embodiment of the present invention.

Referring to FIG. 11, a vertex is first received from a central processing unit and the received vertex is then converted and output (S310).

Next, a plurality of primitives including one or more vertexes is generated (S320).

Next, the plurality of primitives is tiled according to the rendering order of primitives (S330). For example, the plurality of primitives is tile-binned according to the rendering order and is subjected to the first early depth test, and thus, primitive lists for each of the tiles are generated. The tiling step will be described more in detail with reference to FIG. 12.

Figure 12:
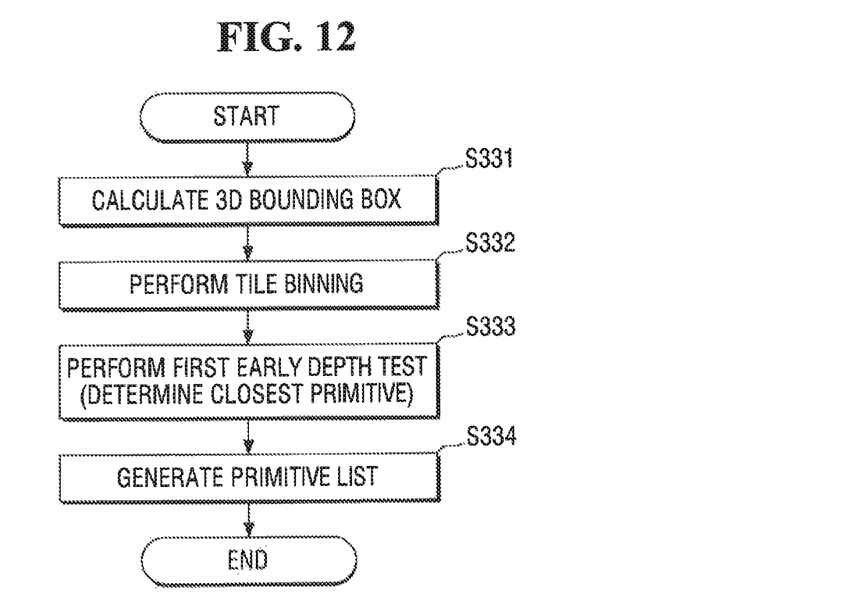
FIG. 12 is a flowchart, illustrating a detailed process of a tiling step shown in FIG. 11.

Referring to FIG. 12, 3D bounding boxes forming boundaries of the plurality of primitives are first calculated (S331).

Next, the plurality of primitives is tile-binned according to the rendering order using values in x and y coordinates of each of the 3D bounding boxes (S332). Here, the plurality of primitives may be tile-binned using the maximum and minimum values in x and y coordinates of each of the 3D bounding boxes.

Next, a first early depth test is performed to determine visibility of a plurality of primitives touching a tile (S333). Here, the maximum and minimum depth values of each of the plurality of primitives are calculated using values in z coordinate of each of the 3D bounding boxes. The maximum and minimum depth values in z coordinate of each of the 3D bounding boxes may be calculated as the maximum and minimum depth values of each of the primitives. A representative primitive for each of the tiles may be determined using the maximum and/or minimum depth values of each of the primitives. For example, when the closest primitive of the plurality of primitives is determined as the representative primitive, a primitive having the minimum depth value greater than the maximum depth value of the tile may be determined as an invisible primitive. Then, data of the invisible primitive may be discarded and visible primitives may be output.

Next, primitive lists for each of the tiles may be generated (S334). Here, the primitive lists for each of the tiles may include identifiers of the visible primitives touching the tile and an identifier of the at least one representative primitive as a property. The primitive lists may be output to and stored in the memory 200.

Referring back to FIG. 11, the visible primitives touching the tile are rasterized (S340) and the step S340 is performed for each of the tiles. Here, the representative primitive may be rasterized prior to the other primitives, and the other primitives may be rasterized according to the rendering order.

The rasterizing step shown in FIG. 11 will now be described in more detail with reference to FIG. 13.

Figure 13:
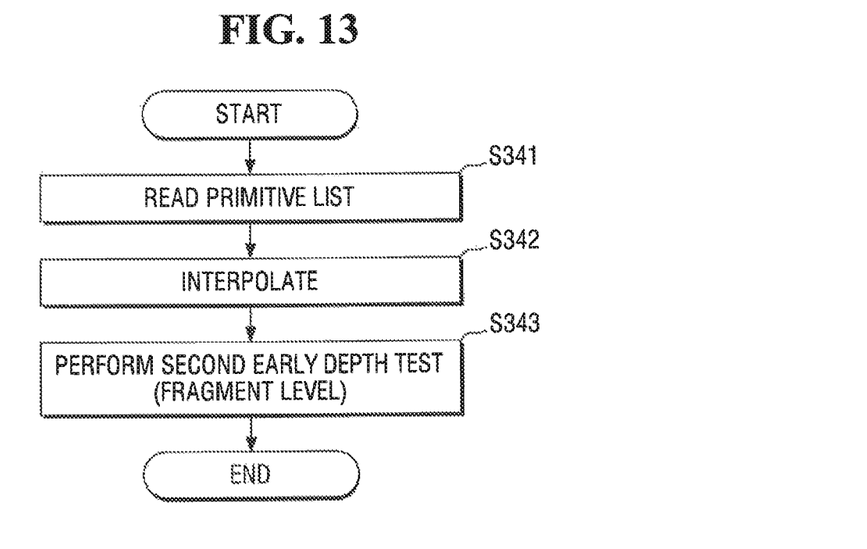
FIG. 13 is a flowchart illustrating a detailed process of a rasterizing step shown in FIG. 11.

Referring to FIG. 13, primitive lists for each of the tiles is first read and then received from the memory (S341). Here, a representative primitive of the primitives in the primitive list is first received prior to the other primitives by referring to an identifier of the representative primitive, and the other primitives may be received according to the rendering order. Alternatively, the representative primitive may be lastly received and the other primitives may be received according to the rendering order. In other words, the rendering order of primitives may be changed.

Next, values of vertexes in each of the primitives in each primitive list are interpolated to generate a set of fragments constituting the inside of the primitives (S342).

Next, a second early depth test may be performed to determine visibility of the fragments in the inside of the tile (S343). Then, data of invisible fragments may be discarded.

Next, referring back to FIG. 11, the rendering may be completely performed by processing the fragments with hidden surface elimination, lighting, surface shading, texture mapping, and so on (S350).

According to an embodiment of the present invention, the early depth tests (e.g., first early depth test and second early depth test) are performed in a primitive level and in a fragment level. The early depth test (e.g., first early depth test) in the primitive level is performed to determine the visibility of all primitives at the tiling stage. Data of invisible primitives may be discarded at the tiling stage. Accordingly, graphic data transferred to the rasterizing stage, unnecessary computations, and memory bandwidths may be reduced, and thus, performance of the graphics pipeline may be increased. The result of the early depth test in the primitive level is provided as the identifier of the representative primitive. At the rasterizing stage, based on the identifier of the representative primitive, the closest primitive may be first rasterized, or the farthest primitive or visible primitives may be lastly rasterized. The other primitives may be rasterized according to the original rendering order. In such a manner, the primitives may be arranged in a front-to-back order. Accordingly, visible primitives are first rendered on an image frame on which rendering has been completely performed and quantity of computations in the early depth test in the fragment level (e.g., second early depth test) may be reduced.

Figure 14:
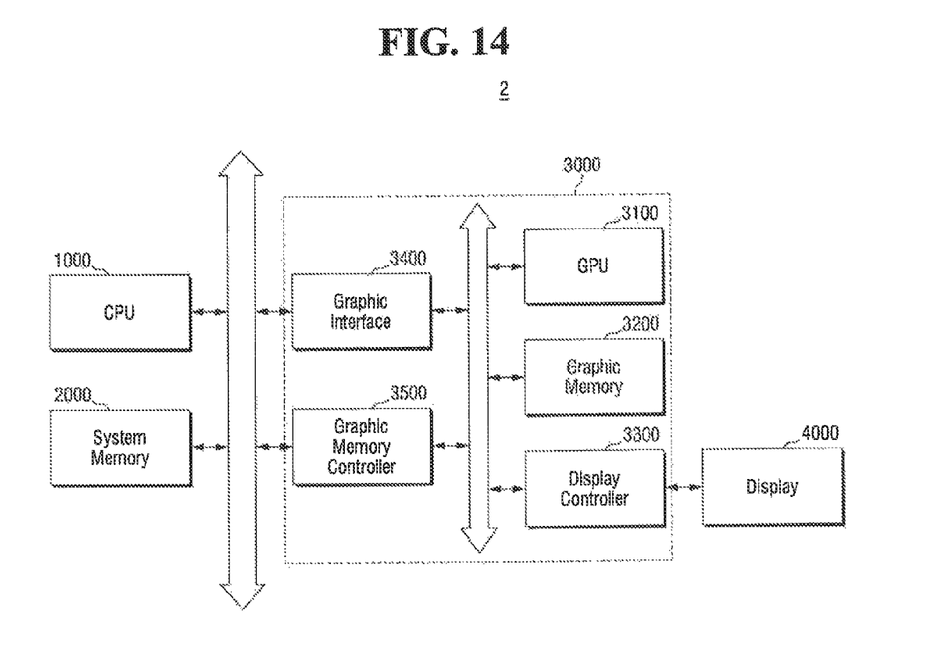
FIG. 14 is a block diagram for explaining an application example of a computing system including a GPU according to an embodiment of the present invention.

FIG. 14 is a block diagram for explaining an application example of a computing system including the GPU according to an embodiment of the present invention.

Referring to FIG. 14, an exemplary computing system 2 according to an embodiment of the present invention includes a CPU 1000, a system memory 2000, a sub graphic system 3000, and a display 4000.

The CPU 1000 may be configured to drive an application to generate a mesh. The mesh may describe a surface of an object. The mesh may include a plurality of primitives, and each primitive may be composed of one or more vertexes.

The system memory 2000 may be configured to store data. The system memory 2000 may store data processed by the CPU 1000. In addition, the system memory 2000 may function as a working memory of the CPU 1000. The system memory 2000 may include at least one volatile memory such as a double data rate static DRAM (DDR SDRAM), a single data rate static DRAM (SDR SDRAM), or the like, and/or at least one nonvolatile memory such as an electrical erasable programmable ROM (EXPROM), a flash memory, or the like.

The sub graphic system 3000 includes a GPU 3100, a graphic memory 3200, a display controller 3300, a graphic interface 3400, and a graphic memory controller 3500.

The GPU 3100 may have substantially the same configuration as the GPU 100 shown in FIG. 1. The GPU 3100 may perform tile-based rendering using a plurality of primitives constituting the mesh. The GPU 3100 may receive data of vertexes constituting the mesh from the CPU 1000. The GPU 3100 may assemble the primitives composed of one or more vertexes and may perform the rendering using the assembled primitive.

The graphic memory 3200 may store graphic data processed by the GPU 3100 or provided to the GPU 3100. In addition, the graphic memory 3200 may function as a working memory of the GPU 3100.

The display controller 3300 may control the display 4000 to display the rendered image frame.

The graphic interface 3400 may perform interfacing between the CPU 1000 and the GPU 3100, and the graphic memory controller 3500 may provide memory accessing between the system memory 2000 and the GPU 3100.

Although not shown in FIG. 14, the computing system 2 may further include one or more input devices such as buttons, a touch screen, or a microphone, and/or one or more output devices such as a speakerphone. In addition, the computing system 2 may further include an interface for exchanging data with an external device in a wired or wireless manner. For example, the interface may include an antenna or a wired/wireless transceiver.

According to an embodiment of the present invention, the computing system 2 may be an arbitrary computing system such as a mobile phone, a smart phone, a personal digital assistant (PDA), a desktop computer, a notebook computer, a tablet computer, or the like.

In concluding the detailed description, it may be understood that various modifications in form may be made to the embodiments without departing from the spirit or scope of the present invention.

What is claimed is:

1. A graphics processing unit comprising:
a tiling unit configured to identify a plurality of primitives touching a first tile of a plurality of tiles in an image frame, to determine a representative primitive of the plurality of primitives using a depth value of each of the plurality of primitives, and to determine visible primitives and invisible primitives of the plurality of primitives for the first tile using a depth value of the representative primitive; and
a rasterizer configured to rasterize the representative primitive and the visible primitives for the first tile,
wherein the representative primitive is rasterized prior to the visible primitives instead of its original rendering order, the invisible primitives are not rasterized, and the visible primitives are rasterized according to their original rendering order,
wherein the representative primitive is determined based on its proximity to a camera among the plurality of primitives that touch the first tile,
wherein the rasterizer is configured to receive a primitive list for the first tile from memory, and the primitive list includes an identifier of the representative primitive and identifiers of the visible primitives,
wherein the rasterizer comprises a sequencer configured to extract the identifier of the representative primitive from the primitive list, and to change the order in which the representative primitive is rasterized by referring to the identifier of the representative primitive.

2. The graphics processing unit of claim 1, wherein the tiling unit includes a first early depth tester configured to determine the visible primitives by comparing a depth value of each of the plurality of primitives with the depth value of the representative primitive.

3. The graphics processing unit of claim 2, wherein the first early depth tester uses a first coverage mask and a second coverage mask to determine the visible primitives, and
wherein the first coverage mask indicates a portion of the first tile touched by the plurality of primitives and the second coverage mask indicates a portion of the first tile touched by the representative primitive.

4. The graphics processing unit of claim 1, wherein the rasterizer comprises:
an interpolation unit configured to generate a plurality of fragments forming an inside of each of the plurality of primitives; and
a second early depth tester configured to determine visibility of each of the plurality of fragments.

5. The graphics processing unit of claim 4, wherein the second early depth tester determines the visibility of each of the plurality of fragments by comparing a depth value of the first tile with a depth value of each of the plurality of fragments.

6. The graphics processing unit of claim 4, wherein the second early depth tester determines the visibility of each of the plurality of fragments by comparing a depth value of each of the plurality of fragments previously rendered at the same position with a depth value of each of the plurality of fragments to be presently rendered belonging to the inside of the first tile.

7. The graphics processing unit of claim 1, wherein the tiling unit outputs the primitive list including the identifiers of the representative primitive and the visible primitives to the memory.

8. The graphics processing unit of claim 1, wherein maximum and minimum depth values of the representative primitive correspond to maximum and minimum depth values of the first tile, respectively.

9. A graphics processing unit comprising:
a tiling unit configured to identify a plurality of primitives touching a corresponding tile of a plurality of tiles in an image frame, to determine a representative primitive of the plurality of primitives using a depth value of each of the plurality of primitives, to perform a first depth test on the plurality of primitives to determine visible primitives of the plurality of primitives for the corresponding tile using a depth value of the representative primitive; and
a rasterizer configured to perform rasterization on the representative primitive and the visible primitives by generating a plurality of fragments forming an inside of each of the representative primitive and the visible primitives, performing a second depth test on the plurality of fragments, and determining visibility of each of the plurality of fragments,
  wherein the representative primitive is rasterized in a different order from a rendering order at the tiling unit, the representative primitive is rasterized before the visible primitives, and the visible primitives are rasterized according to the rendering order,
  wherein the representative primitive is determined based on its proximity to a camera among the primitives that touch the corresponding tile,
  wherein the rasterizer is configured to receive a primitive list for the corresponding tile from memory, and the primitive list includes an identifier of the representative primitive and identifiers of the visible primitives,
  wherein the rasterizer includes a sequencer configured to extract the identifier of the representative primitive from the primitive list, and to change the order in which the representative primitive is rasterized by referring to the identifier of the representative primitive.

10. The graphics processing unit of claim 9, wherein the tiling unit is configured to compare a depth value of each of the plurality of primitives with the depth value of the representative primitive to determine the visible primitives.

11. The graphics processing unit of claim 10, wherein the tiling unit uses a first coverage mask and a second coverage mask to determine the visible primitives, and
  wherein the first coverage mask indicates a portion of the corresponding tile touched by the plurality of primitives and the second coverage mask indicates a portion of the corresponding tile touched by the representative primitive.

12. A tile-based rendering method comprising:
  generating a plurality of primitives each including one or more vertexes;
  calculating a three-dimensional (3D) bounding box forming a boundary for each of the plurality of primitives;
  performing tile binning on the plurality of primitives according to a rendering order using the 3D bounding box;
  calculating a depth value of each of the plurality of primitives using the 3D bounding box;
  determining at least one representative primitive among the plurality of primitives touching a corresponding tile of a plurality of tiles in an image frame using a depth value of each of the plurality of primitives; and
  rasterizing the plurality of primitives touching the corresponding tile,
    wherein the at least one representative primitive among the plurality of primitives touching the corresponding tile is rasterized in a different order from the rendering order, the at least one representative primitive is rasterized first, and the primitives other than the at least one representative are rasterized according to the rendering order,
    wherein the at least one representative primitive is determined based on its proximity to a camera among the primitives that touch the corresponding tile,
    wherein the rasterizing of the plurality of primitives comprises:
      receiving a primitive list for the corresponding tile from the memory;
      extract an identifier of the at least one representative primitive from the primitive list; and
      changing the order in which the at least one representative primitive is rasterized by referring to the identifier of the at least one representative primitive.

13. The tile-based rendering method of claim 12, wherein the performing of the tile binning comprises comparing a depth value of each of the plurality of primitives with the depth value of the at least one representative primitive to determine visibility of the plurality of primitives touching the corresponding tile, and discarding data of invisible primitives.

14. The tile-based rendering method of claim 13, wherein the determining of the visibility of the plurality of primitives comprises using a first coverage mask and a second coverage mask,
  wherein the first coverage mask indicates a portion of the corresponding tile touched by the plurality of primitives and the second coverage mask indicates a portion of the corresponding tile touched by the at least one representative primitive.

* * * * *